United States Patent
Zhu et al.

(10) Patent No.: US 12,477,214 B2
(45) Date of Patent: Nov. 18, 2025

(54) METHODS AND APPARATUSES FOR ASSISTED PET IMAGE CAPTURING

(71) Applicant: Ant Shengxin (Shanghai) Information Technology Co., Ltd., Shanghai (CN)

(72) Inventors: Min Zhu, Hangzhou (CN); Furong Xu, Hangzhou (CN)

(73) Assignee: Ant Shengxin (Shanghai) Information Technology Co., Ltd., Shanghai (CN)

( * ) Notice: Subject to any disclaimer, the term of this patent is extended or adjusted under 35 U.S.C. 154(b) by 102 days.

(21) Appl. No.: 18/482,616

(22) Filed: Oct. 6, 2023

(65) Prior Publication Data

US 2024/0048842 A1    Feb. 8, 2024

Related U.S. Application Data

(63) Continuation of application No. PCT/CN2022/085290, filed on Apr. 6, 2022.

(30) Foreign Application Priority Data

Apr. 6, 2021  (CN) .................. 202110369023.X

(51) Int. Cl.
*H04N 23/60*      (2023.01)
*G06T 7/50*       (2017.01)
(Continued)

(52) U.S. Cl.
CPC .............. *H04N 23/64* (2023.01); *G06T 7/50* (2017.01); *G06V 40/10* (2022.01); *H04N 23/61* (2023.01)

(58) Field of Classification Search
CPC ...... H04N 23/64; H04N 23/61; H04N 23/611; H04N 23/661; H04N 23/959;
(Continued)

(56) References Cited

U.S. PATENT DOCUMENTS 9,716,826 B2 *   7/2017   Wu .................. H04N 23/631
10,268,880 B2 *  4/2019   Wee ................... A61B 5/0077
(Continued)

FOREIGN PATENT DOCUMENTS

CN    105874473    8/2016
CN    106775238    5/2017
(Continued)

OTHER PUBLICATIONS

International Preliminary Report on Patentability in Appln. No. PCT/CN2022/085290, mailed on Oct. 10, 2023, 11 pages (with English translation).

(Continued)

*Primary Examiner* — Usman A Khan
(74) *Attorney, Agent, or Firm* — Fish & Richardson P.C.

(57) ABSTRACT

This specification discloses example computer-implemented methods, computer-readable media and apparatus for assisted image capturing for a pet. In an example, a mapping relationship between several image capturing distance intervals and pet feature types is predetermined. After a pet image capturing instruction is received, a client device invokes an image capturing module to capture a pet image It is determined whether a pet feature having a type that corresponds to an image capturing distance interval to which the pet image belongs is able to be extracted from the pet image. If the pet feature having the type is extracted, the client device outputs an image capturing distance interval adjustment guidance to guide a user to adjust the image capturing distance interval and continues to capture another pet image.

20 Claims, 10 Drawing Sheets

(51) Int. Cl.
*G06V 40/10* (2022.01)
*H04N 23/61* (2023.01)

(58) Field of Classification Search
CPC ........ H04N 23/635; G06T 7/50; G06V 40/10; G06V 10/44; G06V 20/10
USPC ...................................................... 348/222.1
See application file for complete search history.

(56) References Cited

U.S. PATENT DOCUMENTS

| | | | | |
|---|---|---|---|---|
| 2008/0101784 | A1* | 5/2008 | Hsu | G03B 13/18 |
| | | | | 396/89 |
| 2009/0097716 | A1* | 4/2009 | Wang | G06F 3/013 |
| | | | | 382/118 |
| 2013/0142398 | A1* | 6/2013 | Polimeno | G06F 3/0484 |
| | | | | 382/110 |
| 2014/0036104 | A1* | 2/2014 | Nonaka | H04N 23/63 |
| | | | | 348/222.1 |
| 2014/0184849 | A1* | 7/2014 | Kim | H04N 23/667 |
| | | | | 348/231.99 |
| 2015/0229838 | A1 | 8/2015 | Hakim et al. | |
| 2015/0358521 | A1 | 12/2015 | Nonaka | |
| 2016/0080633 | A1* | 3/2016 | Hong | H04N 23/611 |
| | | | | 348/169 |
| 2020/0077016 | A1* | 3/2020 | Shanmugam | H04N 23/62 |
| 2020/0175256 | A1* | 6/2020 | Benini | G06V 40/45 |
| 2023/0320328 | A1* | 10/2023 | Nakamura | G06V 10/774 |
| | | | | 382/103 |

FOREIGN PATENT DOCUMENTS

| | | |
|---|---|---|
| CN | 109325488 | 2/2019 |
| CN | 110428410 | 11/2019 |
| CN | 110728244 | 1/2020 |
| CN | 111597942 | 8/2020 |
| CN | 111932604 | 11/2020 |
| CN | 113132632 | 7/2021 |
| JP | 2013161406 | 8/2013 |
| WO | WO 2017215351 | 12/2017 |

OTHER PUBLICATIONS

International Search Report and Written Opinion in Appln. No. PCT/CN2022/085290, mailed on Jun. 21, 2022, 17 pages (with English translation).
Extended European Search Report in European Appln. No. 22784040.2, mailed on Aug. 21, 2024, 9 pages.

* cited by examiner

METHODS AND APPARATUSES FOR ASSISTED PET IMAGE CAPTURING

CROSS-REFERENCE TO RELATED APPLICATIONS

This application is a continuation of PCT Application No. PCT/CN2022/085290, filed on Apr. 6, 2022, which claims priority to Chinese Patent Application No. 202110369023.X, filed on Apr. 6, 2021, and each application is hereby incorporated by reference in its entirety.

TECHNICAL FIELD

This specification relates to the field of artificial intelligence, and in particular, to assisted image capturing methods and apparatuses for pets.

BACKGROUND

With development of technologies, a user can purchase pet insurance for a pet to protect benefits. In a process of purchasing the pet insurance, the user needs to take pictures of the pet from various angles to prove an identity of the pet. In an image capturing process, an operation of the user can be inconvenient because the pet does not cooperate, use experience is poor, and identification of the pet identity can be affected because quality of the picture is not high.

SUMMARY

In view of this, this specification provides assisted image capturing methods for pets.

Specifically, this specification is implemented by using the following technical solutions: An assisted image capturing method for a pet, where a mapping relationship between several image capturing distance intervals and pet feature types is predetermined, and the method is applied to a client and includes: after a pet image capturing instruction is received, invoking an image capturing module to capture a pet image; determining whether a pet feature having a type that corresponds to an image capturing distance interval to which the pet image belongs is able to be extracted from the pet image; and when the pet feature having the type is extracted, outputting an image capturing distance interval adjustment guidance, so as to guide a user to adjust the image capturing distance interval, and continuing to capture another pet image.

An assisted image capturing method for a pet, where a mapping relationship between several image capturing distance intervals and pet feature types is predetermined, and the method is applied to a server and includes: receiving a pet image sent by a client, where the pet image is captured by the client by invoking an image capturing module after receiving a pet image capturing instruction; determining an image capturing distance interval corresponding to the pet image; determining whether a pet feature of a type corresponding to the image capturing distance interval is able to be extracted from the pet image; and sending a determining result to the client, so when the determining result is that the pet feature of the type is able to be extracted, the client outputs an image capturing distance interval adjustment guidance, so as to guide a user to adjust the image capturing distance interval, and continue to capture another pet image.

An assisted image capturing apparatus for a pet, where a mapping relationship between several image capturing distance intervals and pet feature types is predetermined, and the apparatus is applied to a client and includes: an image capturing unit, configured to: after a pet image capturing instruction is received, invoke an image capturing module to capture a pet image; an extraction determining unit, configured to determine whether a pet feature having a type that corresponds to an image capturing distance interval to which the pet image belongs is able to be extracted from the pet image; and an adjustment guidance unit, configured to: when the pet feature having the type is extracted, output an image capturing distance interval adjustment guidance, so as to guide a user to adjust the image capturing distance interval, and continuing to capture another pet image.

An assisted image capturing apparatus for a pet, where a mapping relationship between several image capturing distance intervals and pet feature types is predetermined, and the apparatus is applied to a server and includes: an image receiving unit, configured to receive a pet image sent by a client, where the pet image is captured by the client by invoking an image capturing module after receiving a pet image capturing instruction; an interval determining unit, configured to determine an image capturing distance interval corresponding to the pet image; a feature extraction unit, configured to determine whether a pet feature of a type corresponding to the image capturing distance interval is able to be extracted from the pet image; and a result sending unit, configured to send a determining result to the client, so when the determining result is that the pet feature of the type is able to be extracted, the client outputs an image capturing distance interval adjustment guidance, so as to guide a user to adjust the image capturing distance interval, and continue to capture another pet image.

An assisted image capturing apparatus for a pet, applied to a client and including: a processor; and a memory, configured to store machine executable instructions; whereby reading and executing the machine executable instructions that are stored in the memory and that correspond to an assisted image capturing logic for a pet, the processor is enabled to: after a pet image capturing instruction is received, invoke an image capturing module to capture a pet image; determine whether a pet feature having a type that corresponds to an image capturing distance interval to which the pet image belongs is able to be extracted from the pet image; and when the pet feature having the type is extracted, output an image capturing distance interval adjustment guidance, so as to guide a user to adjust the image capturing distance interval, and continue to capture another pet image.

An assisted image capturing apparatus for a pet, applied to a server and including: a processor; and a memory, configured to store machine executable instructions; whereby reading and executing the machine executable instructions that are stored in the memory and that correspond to an assisted image capturing logic for a pet, the processor is enabled to: receive a pet image sent by a client, where the pet image is captured by the client by invoking an image capturing module after receiving a pet image capturing instruction; determine an image capturing distance interval corresponding to the pet image; determine whether a pet feature of a type corresponding to the image capturing distance interval is able to be extracted from the pet image; and send a determining result to the client, so when the determining result is that the pet feature of the type is able to be extracted, the client outputs an image capturing distance interval adjustment guidance, so as to guide a user to adjust the image capturing distance interval, and continue to capture another pet image.

In an embodiment of this specification, after receiving a pet image capturing instruction, a client can invoke an image capturing module to capture a pet image, determine whether a pet feature having a type that corresponds to an image capturing distance interval to which the pet feature belongs is able to be extracted from the pet image, and when the pet feature is able to be extracted, output an image capturing distance interval adjustment guidance, so as to guide a user to adjust an image capturing distance, and continue to capture an image.

By using the above-mentioned method, a guidance can be output when the user takes a pet image, and after one or more pet features having types that correspond to a current image capturing distance interval are extracted, the user is guided to adjust an image capturing distance to continue to capture another image, so as to extract a pet feature having a type that corresponds to another image capturing distance interval. In the entire process, multiple types of pet features can be extracted by means of a one-time, continuous image capturing process, and the user does not need to capture multiple images. This process is more convenient for users to operate and provides better experience.

DESCRIPTION OF EMBODIMENTS

Example embodiments are described in detail here, and examples of the example embodiments are presented in the accompanying drawings. When the following description relates to the accompanying drawings, unless specified otherwise, the same numbers in different accompanying drawings represent the same or similar elements. Embodiments described in the following example embodiments do not represent all embodiments consistent with this specification. On the contrary, the embodiments are merely examples of apparatuses and methods that are described in the appended claims in details and consistent with some aspects of this specification.

The terms used in this specification are merely for illustrating specific embodiments, and are not intended to limit this specification. The terms "a" and "the" of singular forms used in this specification and the appended claims are also intended to include plural forms, unless otherwise specified in the context clearly. It should be further understood that the term "and/or" used in this specification indicates and includes any or all possible combinations of one or more associated listed items.

It should be understood that although the terms such as "first", "second", and "third" can be used in this specification to describe various types of information, the information is not limited to these terms. These terms are merely used to differentiate between information of the same type. For example, without departing from the scope of this specification, first information can also be referred to as second information, and similarly, the second information can be referred to as the first information. Depending on the context, for example, the word "if" used here can be explained as "while", "when", or "in response to determining".

With development of technologies, a user can purchase pet insurance for a pet to protect benefits. In a process of purchasing the pet insurance, the user usually needs to take pictures of the pet from multiple angles, to extract multiple features based on the images, to determine a pet identity. In a related technology, the user needs to separately take a picture from each angle, an operation is inconvenient, and user experience is relatively poor.

Based on this, this specification provides an assisted image capturing method for a pet, so as to guide a user to take a pet image, thereby improving user experience.

It is worthwhile to note that although this specification provides an assisted image capturing method for a pet, the method can also be applied to an image capturing scenario of another animal other than the pet. For example, the method can also be applied to image capturing of a farmed animal in a farming scenario. This is not specifically limited in this specification.

Figure 1:
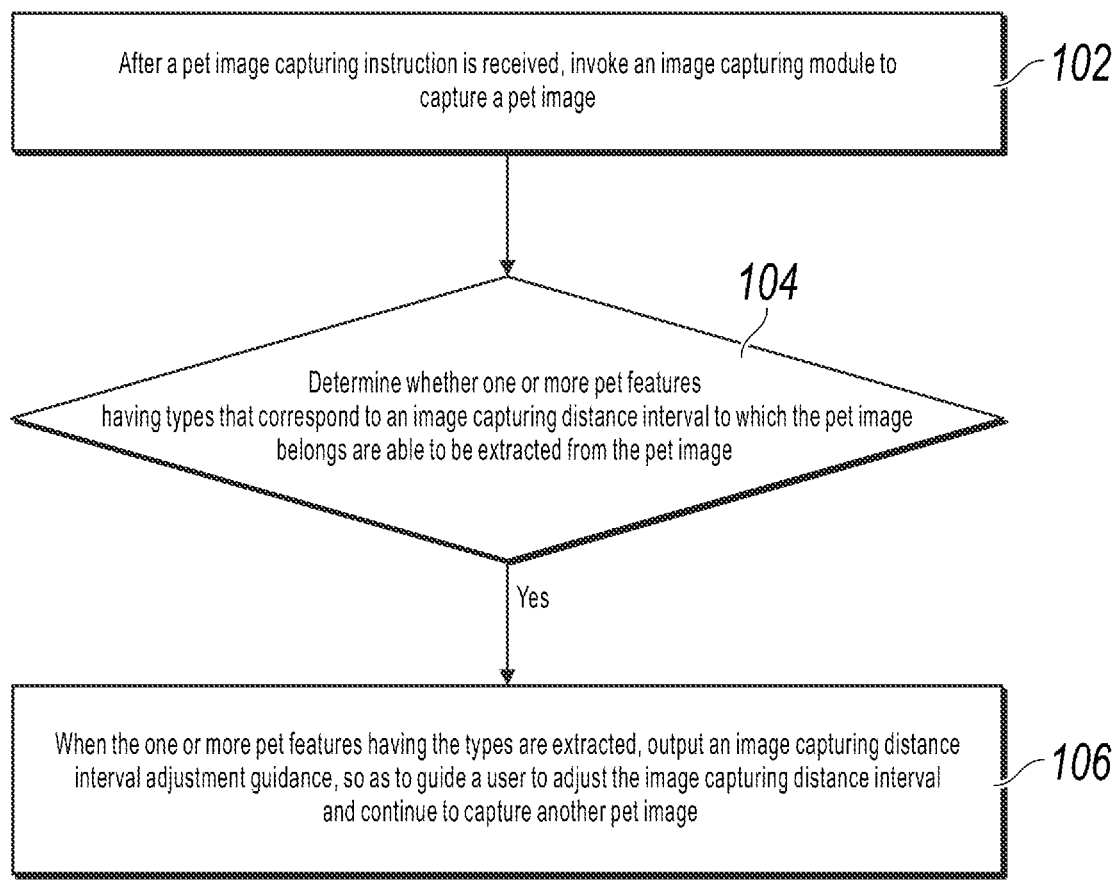
FIG. 1 is a schematic flowchart illustrating an assisted image capturing method for a pet, according to an example embodiment of this specification.

Referring to FIG. 1, FIG. 1 is a schematic flowchart illustrating an assisted image capturing method for a pet, according to an example embodiment of this specification. The method can be applied to a client, for example, application software or an applet. The client can be installed on a terminal device, for example, a mobile phone or a tablet computer.

The method can include the following steps: step 102: After a pet image capturing instruction is received, invoke an image capturing module to capture a pet image; step 104: Determine whether a pet feature having a type that corresponds to an image capturing distance interval to which the pet image belongs is able to be extracted from the pet image; and step 106: When the pet feature having the type is extracted, output an image capturing distance interval adjustment guidance, so as to guide a user to adjust the image capturing distance interval, and continue to capture another pet image.

The following describes the above-mentioned steps in detail:

In this embodiment, the user can initiate a pet image capturing instruction. For example, the user can tap an image capturing button to initiate a pet image capturing instruction, or a pet image capturing instruction can be automatically initiated after a specified page is opened. This is not specifically limited. After receiving the pet image capturing instruction, the client can invoke the image capturing module to capture a pet image. The image capturing module can be a camera loaded on the terminal device. After being invoked, the image capturing module can automatically capture an image, and the client can obtain an image frame from the image.

In this embodiment, several different image capturing distance intervals are predetermined, and each image capturing distance interval has a pet feature of a corresponding type. Corresponding pet features can be extracted by using pet images captured in different image capturing distance intervals. For example, for a relatively closer image capturing distance interval, pet details such as the nose of the pet can be captured. In this case, a pet feature corresponding to this image capturing distance interval can be a pet nose print. The pet nose print is similar to a fingerprint of a human, and is a feature that can be used to prove pet uniqueness. For another example, for a relatively far image capturing distance interval, the overall appearance of the pet such as the whole body of the pet can be captured. In this case, a pet feature corresponding to this image capturing distance can be the whole-body feature of the pet. Because different pets have different image capturing distances, intervals can be set for a "close image capturing distance" and a "far image capturing distance", and specific values of the intervals can be determined according to an actual application scenario.

In this embodiment, after obtaining the pet image captured by the image capturing module, the client can send the pet image to a server, so the server determines an image capturing distance interval corresponding to the pet image, determines whether a pet feature of a type corresponding to the image capturing distance interval is able to be extracted from the pet image, and sends a determining result to the client. For example, after receiving the pet image, the server can first determine that the image capturing distance interval to which the pet image belongs is a "close image capturing distance interval", and a corresponding pet feature type is a nose print feature. In this case, the server can determine whether the nose print feature is able to be extracted from the pet image, and send the determining result to the client.

After receiving the determining result, the client can guide, based on the determining result, the user to capture images. For example, when determining that the corresponding pet feature is able to be extracted from the pet image, the client can output an image capturing distance interval adjustment guidance, so as to guide the user to adjust the image capturing distance and capture an adjusted pet image, so as to extract another type of pet feature from the pet image. Specific steps are the same as those in the above-mentioned embodiment, and details are omitted here for simplicity. The image capturing distance interval adjustment guidance can be an audio, a text, an identifier, etc., which is not specially limited.

It can be understood from the above-mentioned description that, in an embodiment of this specification, after receiving a pet image capturing instruction, a client can invoke an image capturing module to capture a pet image, determine whether a pet feature having a type that corresponds to an image capturing distance interval to which the pet feature belongs is able to be extracted from the pet image, and when the pet feature is able to be extracted, output an image capturing distance interval adjustment guidance, so as to guide a user to adjust an image capturing distance, and continue to capture an image.

By using the above-mentioned method, a guidance can be output when the user takes a pet image, and after a pet feature of a type corresponding to a current image capturing distance interval is extracted, the user is guided to adjust an image capturing distance to continue to capture an image, so as to extract a pet feature of a type corresponding to another image capturing distance interval. In the entire process, multiple types of pet features can be extracted by means of a one-time, continuous image capturing process, and the user does not need to capture multiple images. This process is more convenient for users to operate and provides better experience.

The following describes an embodiment of another assisted image capturing method for a pet provided in this specification.

In this embodiment, three image capturing distance intervals can be set: a close image capturing distance interval, a medium image capturing distance interval, and a far image capturing distance interval. In addition, each image capturing distance interval can be corresponding to one type of pet feature. Refer to the following Table 1.

TABLE 1

| Image capturing distance interval | Pet feature type |
| --- | --- |
| Close | Nose print feature |
| Medium | Front face feature |
| Far | Whole-body feature |

Figure 2:
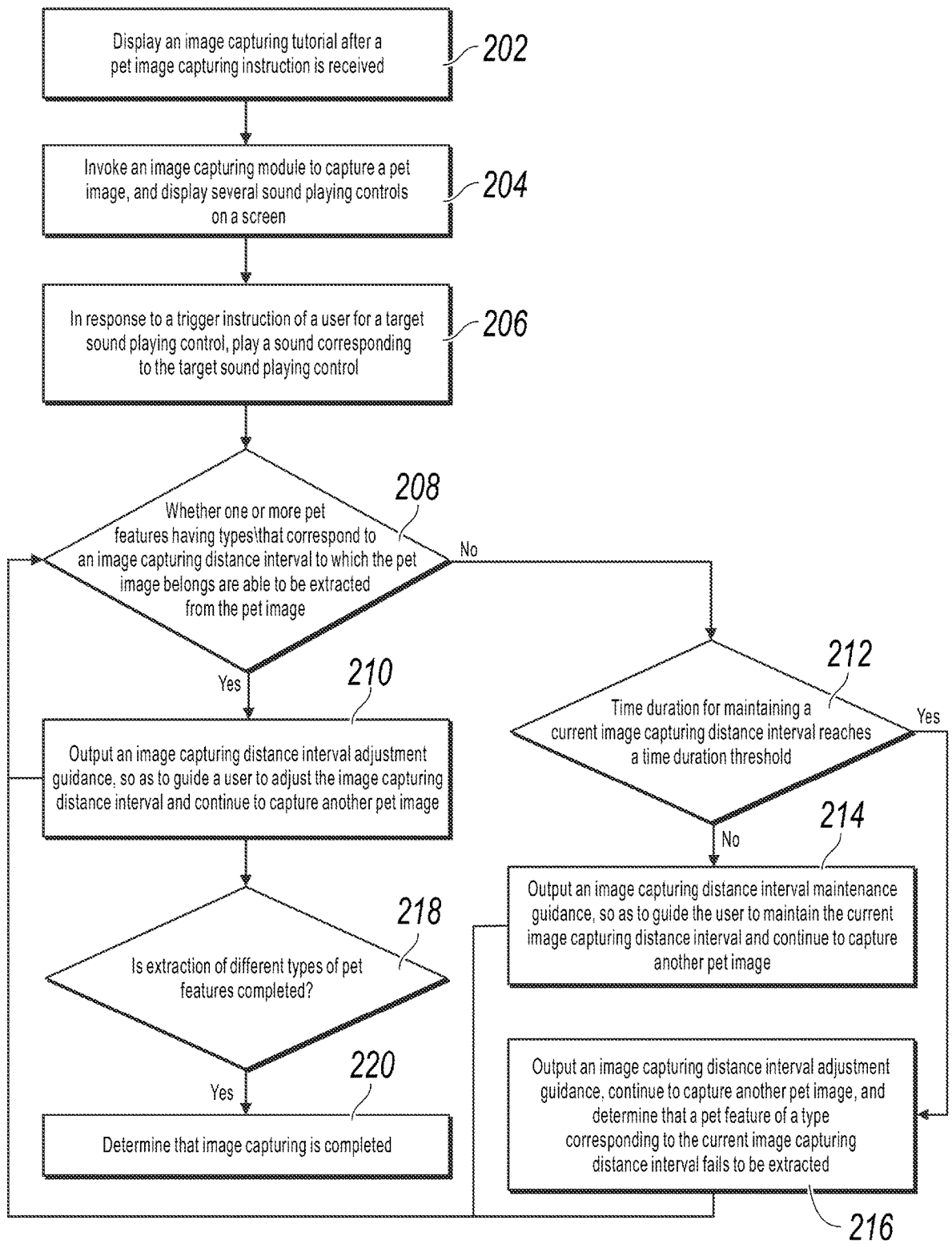
FIG. 2 is a schematic flowchart illustrating another assisted image capturing method for a pet, according to an example embodiment of this specification.

Referring to FIG. 2, FIG. 2 is a schematic flowchart illustrating another assisted image capturing method for a pet, according to an example embodiment of this specification. The method can be applied to a client and includes the following steps: Step 202: Display an image capturing tutorial after a pet image capturing instruction is received.

In this step, the client can display a related page of pet insurance to a user. Introduction information of the pet insurance can be displayed on the page, and an insure button can also be displayed. When the user needs insuring, the user can tap the insure button to enter an insuring page, and the insuring page can include an image capturing button. The user can tap the image capturing button to initiate a pet image capturing instruction. After receiving the instruction, the client can first display an image capturing tutorial to the user, and then invoke an image capturing module to capture an image.

The image capturing tutorial can be one or more of a video, an animation, an audio, or a text. The image capturing tutorial can display several different image capturing distance intervals, and can further display pet feature types that need to be extracted from the different image capturing distance intervals, so as to prompt the user to take pet images according to the different image capturing distance intervals and extract pet features of corresponding types.

For example, the user can be prompted to capture images in ascending order of image capturing distance intervals. For the above-mentioned Table 1, the user can be first guided to capture images according to the "close image capturing distance interval", then capture images according to the "medium image capturing distance interval", and finally capture images according to the "far image capturing distance interval". In the image capturing tutorial, a close-range image capturing method can be first displayed. For example, the user is prompted to approach the pet nose, and stay around the pet nose for a moment to obtain a clear image. After display of a nose print image capturing method is completed, a next image capturing method for a front face feature can be automatically displayed. For example, the user is prompted to slowly move away from the pet nose until an image of the front face is taken. Certainly, or the user can actively tap a button such as "next" to display an image capturing method for a next feature. Similarly, after display of the front face image capturing method is completed, an image capturing method for the whole body of the pet can be displayed.

By using this image capturing sequence, the user can first capture images of pet details, for example, the pet nose, and then can first extract a nose print feature of the pet, which helps the client subsequently determine a pet identity based on the nose print feature. In addition, when image capturing is started, attention of the pet can be relatively focused, which is also convenient for capturing a relatively clear nose image, and helps extract the nose print feature.

Certainly, the user can alternatively be prompted to capture images in descending order of image capturing distance intervals, or another order. This is not specially limited.

The image capturing tutorial can be automatically displayed. For example, after the user initiates a pet image capturing instruction, the image capturing tutorial is automatically displayed on a client page, and after the display is completed, the image capturing module can be automatically invoked to capture a pet image. Or the image capturing tutorial can be passively displayed, for example, can be displayed after the user taps a button "display image capturing tutorial".

Step 204: Invoke an image capturing module to capture a pet image, and display several sound playing controls on a screen.

Step 206: In response to a trigger instruction of a user for a target sound playing control, play a sound corresponding to the target sound playing control.

In this embodiment, after the image capturing tutorial is displayed, the image capturing module starts to capture the pet image, and a picture captured by the image capturing module in real time can be displayed on a screen of a terminal device used by the user.

In addition, several sound playing controls can be further displayed on the screen, and each sound playing control can be corresponding to different types of sounds, for example, can be a sound of an animal, such as sound of a cat, sound of a dog, or a sound of bird. For another example, the sound can alternatively be a natural sound, such as a thunder sound or a rain sound. For another example, the sound can alternatively be a user-defined sound. This is not specially limited (refer to FIG. 3).

The user can tap any target sound playing control to trigger an instruction. After receiving the instruction, the client can play a sound corresponding to the target sound playing control. For example, if the image of a pet that is currently being captured by the user is a dog, the user can tap a sound playing control for sound of a dog or a sound playing control for sound of a cat to attract attention of the dog.

According to the above-mentioned method for displaying several sound playing controls on the screen, the user can be assisted to attract attention of the pet in a process of taking a pet image, so the user can take a clearer pet image, and a problem that the pet does not cooperate during image capturing can be alleviated.

It is worthwhile to note that, in this embodiment, the sound playing control can be displayed on the screen in the entire process in which the user takes the pet image, or the sound playing control can be displayed only when it is detected that the pet feature cannot be extracted from the pet image captured by the user. This is not specially limited.

Figure 3:
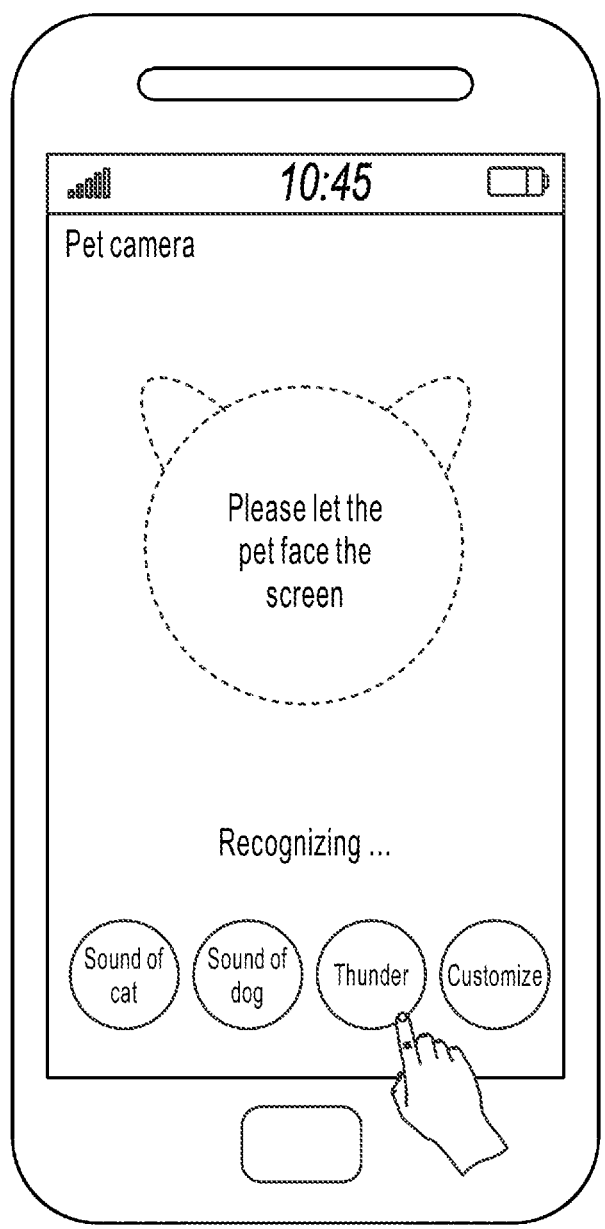
FIG. 3 is a schematic diagram illustrating a page, according to an example embodiment of this specification.

In addition, in this embodiment, image capturing distance interval guidance information can further be output on the screen. The guidance information can be an audio, a text, or a specific pattern. As shown in FIG. 3, when a pet front face image is taken by using the "medium image capturing distance interval", a dashed line box in a shape of the pet front face and a text reminder of "please let the pet face the screen" can be displayed on the screen. An image capturing distance interval corresponding to the guidance information can be a start image capturing distance interval in a predetermined sequence of the image capturing distance intervals.

Step 208: Determine whether a pet feature having a type that corresponds to an image capturing distance interval to which the pet image belongs is able to be extracted from the pet image.

In this embodiment, the client can send the pet image captured by the image capturing module to a server, so the server determines an image capturing distance interval to which the pet image belongs, determines whether a pet feature of a type corresponding to the image capturing distance interval is able to be extracted from the pet image, and sends a determining result to the client. A process of determining by the server is described in the following embodiment.

In an example, the client can send only the pet image to the server, and the server can determine the image capturing distance interval based on the pet image.

In another example, the client can also determine the image capturing distance interval to which the pet image belongs, and send both the pet image and the image capturing distance interval to the server. In this case, the server can directly use the image capturing distance interval sent by the client as the image capturing distance interval of the pet image. The client can determine the image capturing distance interval by analyzing an image capturing focal length of the pet image. Certainly, the image capturing distance interval can alternatively be determined according to another method. This is not specially limited.

In this embodiment, the client can receive two types of determining results sent by the server, that is, a pet feature of a corresponding type is able to be extracted, and a pet feature of a corresponding type is unable to be extracted. The following separately describes the two cases.

Step 210: If yes, output an image capturing distance interval adjustment guidance, so as to guide a user to adjust the image capturing distance interval, and continue to capture another pet image.

In this embodiment, if the determining result received by the client is that the corresponding pet feature is able to be extracted from the pet image taken by the user, the client can output the image capturing distance interval adjustment guidance, so as to guide the user to adjust the image capturing distance interval.

Figure 4:
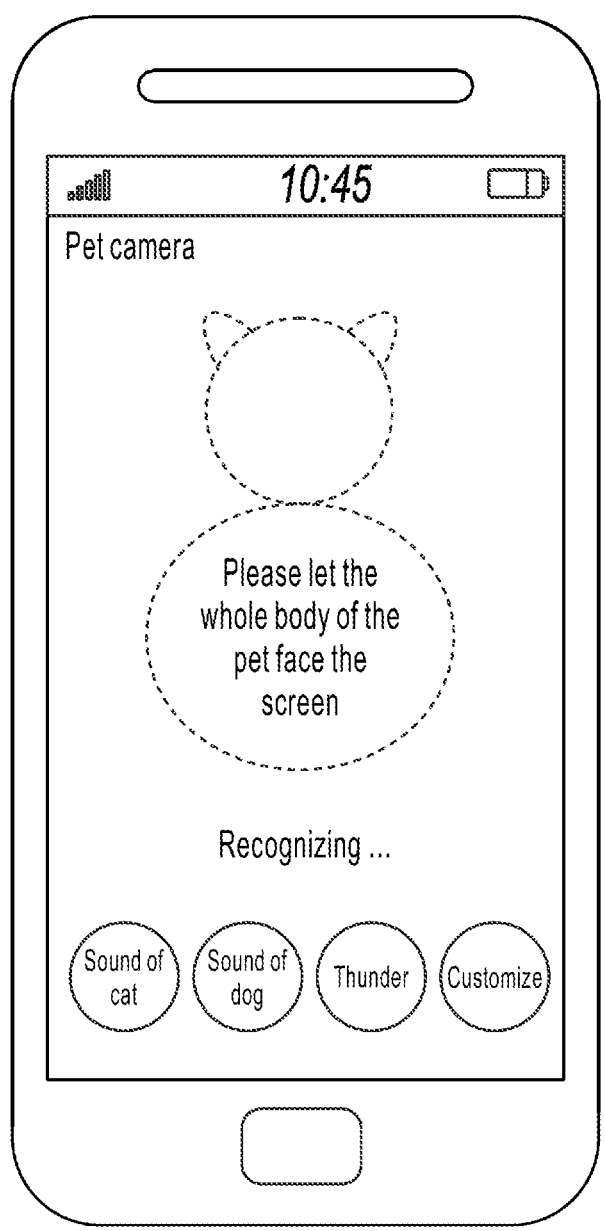
FIG. 4 is a schematic diagram illustrating another page, according to an example embodiment of this specification.

For example, assume that in step 208, the user takes the pet image according to the "medium image capturing distance interval" (refer to FIG. 3), and the server extracts, from the captured pet image, a front face feature corresponding to the distance interval, the client can guide the user to adjust the image capturing distance interval. For example, the user can be enabled to take the pet image according to the "far image capturing distance interval". As such, the server can extract a whole-body feature of the pet from the pet image captured according to the "far image capturing distance interval". The image capturing distance adjustment guidance can be an audio, a text, a specified pattern, etc. References can be made to a dashed line box in a shape of the whole body of the pet in FIG. 4 and a text prompt of "please let the whole body of the pet face the screen".

The client can follow a predetermined image capturing distance interval change sequence to guide the user to adjust the image capturing distance interval. For example, the predetermined image capturing distance change sequence can be from close to far. Then, after image capturing in the "close image capturing distance interval" is completed, the user can be guided to capture images in the "medium image capturing distance interval", and after image capturing is completed, the user can be guided to capture images in the "far image capturing distance interval".

In this embodiment, after guiding the user to adjust the image capturing distance interval, the client can continue to obtain the captured pet image, and perform step 208.

Step 212: If no, determine whether a time duration for maintaining a current image capturing distance interval reaches a time duration threshold. If not, step 214 is performed. If yes, step 216 is performed.

Step 214: Output an image capturing distance interval maintenance guidance, so as to guide the user to maintain the current image capturing distance interval, and continue to capture another pet image.

Step 216: Output an image capturing distance interval adjustment guidance, continue to capture another pet image, and determine that a pet feature of a type corresponding to the current image capturing distance interval fails to be extracted.

In this embodiment, if the determining result received by the client is that the corresponding pet feature is unable to be extracted from the pet image taken by the user, the client can determine whether the time duration for maintaining the current image capturing distance interval reaches the time duration threshold, where the time duration threshold can be predetermined.

If the time duration threshold is not reached, an image capturing distance interval maintenance guidance can be output to guide the user to maintain the current image capturing distance interval, and continue to capture another pet image, so the client can extract the corresponding pet feature from the continuously captured pet images.

For example, assume that in step 208, the user takes the pet image according to the "medium image capturing distance interval", and the server fails to extract, from the captured pet image, the front face feature corresponding to the distance interval, the client can guide the user to maintain the current image capturing distance interval for continuous image capturing, that is, the user can continue to take the pet image according to the "medium image capturing distance interval". Certainly, maintaining the image capturing distance interval by the user here does not mean that the user needs to maintain a fixed image capturing distance, but can perform proper adjustment on the image capturing distance within a range provided that the range satisfies the "medium image capturing distance interval".

In this embodiment, if the time duration for maintaining the current image capturing distance interval reaches the time duration threshold, the image capturing distance interval adjustment guidance can be output, and it is determined that the pet feature of the type corresponding to the current image capturing distance interval fails to be extracted. For the image capturing distance interval adjustment guidance, refer to the above-mentioned embodiments.

For these pet features that are not extracted temporarily, when pet images are subsequently captured by using another image capturing distance interval, extraction can be performed from these images (which will be described in the following embodiment); or after image capturing is completed according to a predetermined image capturing distance interval change sequence, it can be first temporarily determined that image capturing is completed, and subsequently, the user is enabled to re-take a pet image for a pet feature that is not extracted.

By using the above-mentioned method, when the user does not extract the corresponding pet feature after maintaining the image capturing distance for a period of time, the user can be guided to adjust the image capturing distance, and subsequently obtain these non-extracted features by using another method, so as to alleviate a problem of poor user experience caused by long-time image capturing performed by the user.

Step 218: Determine whether extraction of different types of pet features is completed. If yes, step 220 is performed.

Step 220: Determine that image capturing is completed.

In this embodiment, the client can determine whether extraction of each predetermined type of pet feature is completed. If extraction is completed, it can be determined that image capturing is completed, and a prompt indicating that image capturing is completed can further be output. In addition, the client can further preview a video obtained in an image capturing process.

Certainly, in another embodiment, if a pet feature is not extracted after image capturing is completed according to the predetermined image capturing distance interval change sequence, it can be temporarily determined that image capturing is completed, and the user is subsequently prompted to re-take and upload a pet image at a specified angle for the pet feature that is not extracted. After all the pet features are extracted, it is finally determined that image capturing is completed.

It can be understood from the above-mentioned description that, in an embodiment of this specification, an image capturing tutorial can be further displayed to the user, and a change sequence of different image capturing distance intervals can be further displayed in the tutorial, so as to help the user better and more accurately capture images, and improve user experience. In addition, a sound playing control can be further displayed on a related page, so the user can attract attention of the pet by using different sounds, thereby alleviating a problem that the pet does not cooperate during image capturing. In addition, when a pet feature of a type corresponding to an image capturing distance interval is not extracted, an image capturing distance maintenance guidance can be output to prompt the user to continue to capture another pet image according to the current image capturing distance interval, so the server obtains sufficient pet images to perform feature extraction.

By using the above-mentioned method, on the basis of ensuring user experience, the server can be assisted to obtain a pet feature by means of extraction according to sufficient and clear pet images, feature extraction efficiency is improved, and a problem that the pet does not cooperate during image capturing can also be alleviated.

The following describes another assisted image capturing method for a pet provided in this specification.

Figure 5:
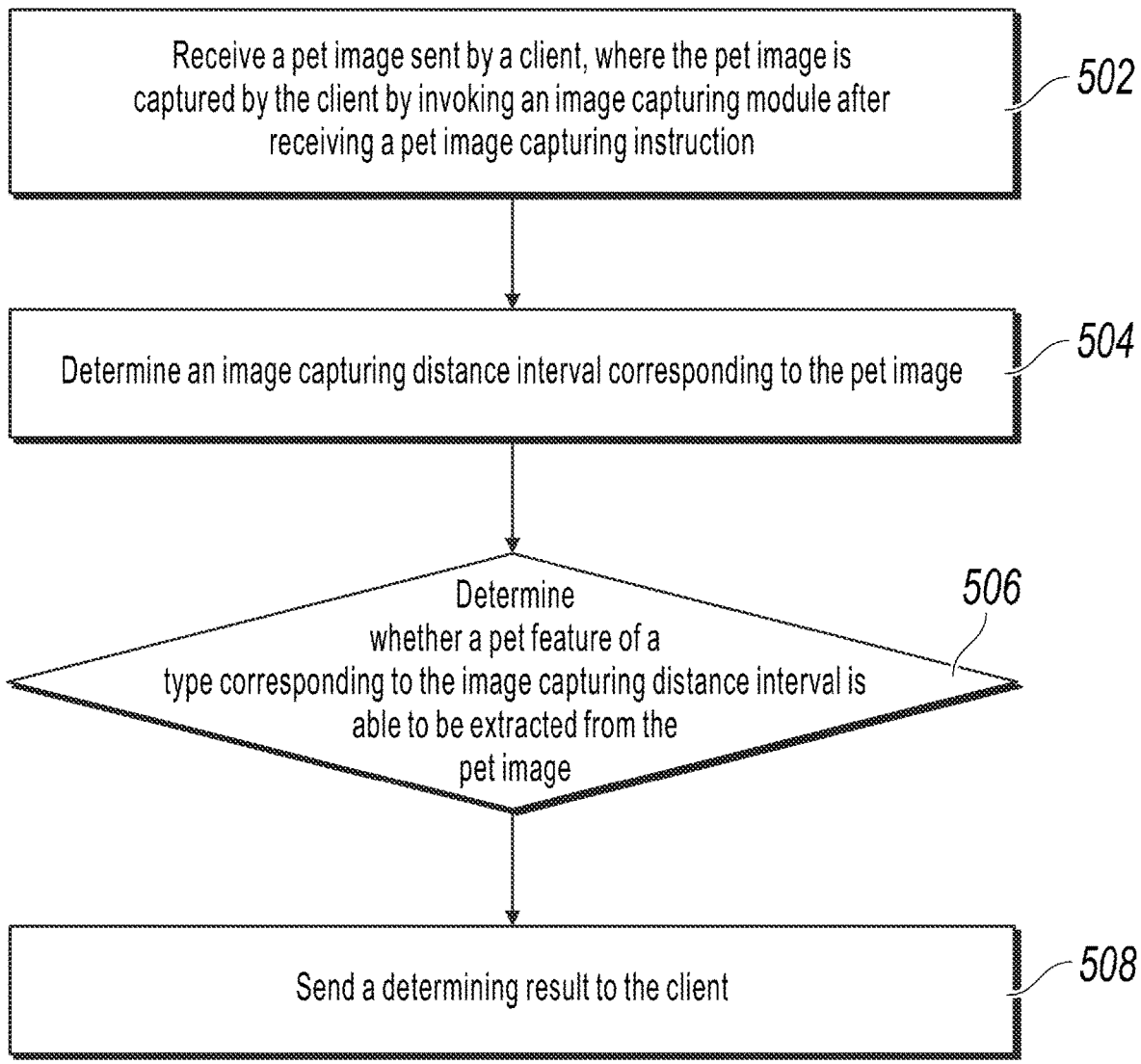
FIG. 5 is a schematic flowchart illustrating another assisted image capturing method for a pet, according to an example embodiment of this specification.

Referring to FIG. 5, FIG. 5 is a schematic flowchart illustrating another assisted image capturing method for a pet, according to an example embodiment of this specification. The method is applied to a server and includes the following steps: step 502: Receive a pet image sent by a client, where the pet image is captured by the client by invoking an image capturing module after receiving a pet image capturing instruction; step 504: Determine an image capturing distance interval corresponding to the pet image;

step 506: Determine whether a pet feature of a type corresponding to the image capturing distance interval is able to be extracted from the pet image; and step 508: Send a determining result to the client.

The following describes the above-mentioned steps in detail:

In this embodiment, the server can receive the pet image sent by the client. The pet image is captured by the client by invoking the image capturing module after receiving the pet image capturing instruction. For details, refer to the above-mentioned embodiment.

In an example, the client can send only the pet image, and the server can determine a corresponding image capturing distance interval according to the pet image. For example, the server can input the pet image into a pre-trained distance recognition model. The model can be obtained by means of training by using a large quantity of pet images at different image capturing distances as training samples and using image capturing distance intervals as sample labels. The server can determine the corresponding image capturing distance interval according to an output result of the model.

In another example, in addition to sending the pet image, the client can further send an image capturing distance interval to which the pet image belongs. The image capturing distance interval can be determined by the image capturing module of the client according to an image capturing focal length. In this case, the server can directly use the image capturing distance interval sent by the client as the image capturing distance interval corresponding to the pet image.

Certainly, in another embodiment, the server can alternatively determine the image capturing distance interval of the pet image by using another method, or can determine the image capturing distance interval with reference to the above-mentioned two methods. This is not specially limited.

In this embodiment, after determining the image capturing distance interval corresponding to the pet image, the server can determine whether a pet feature of a type corresponding to the image capturing distance interval is able to be extracted from the pet image.

In an example, the server can train feature extraction models corresponding to different types of pet features in advance. For example, a feature extraction model corresponding to a nose print feature, a feature extraction model corresponding to a front face feature, and a feature extraction model corresponding to a whole-body feature can exist.

The server can input the pet image into a feature extraction model corresponding to the pet image. The model can output an extracted pet features, and can further output a confidence level. When the confidence level satisfies a requirement, the server can determine that the pet feature is extracted. On the contrary, if the confidence level does not satisfy the requirement, the server can determine that the pet feature is not extracted.

In this embodiment, the server can send a determining result to the client, so when the determining result is that the pet feature of the type is able to be extracted, the client outputs an image capturing distance interval adjustment guidance, so as to guide a user to adjust the image capturing distance interval, and continue to capture another pet image.

It can be understood from the above-mentioned description that, in an embodiment of this specification, the server can receive the pet image sent by the client, determine whether the pet image has the pet feature corresponding to the image capturing distance interval to which the pet image belongs, and send the determining result to the client, so the client can output different image capturing guidance information according to different determining results, so as to guide the user to capture images, and use experience of taking the pet image by the user can be improved.

The following describes another assisted image capturing method for a pet provided in this specification. This embodiment is described from a perspective of interaction between a server and a client.

In this embodiment, three image capturing distance intervals can be set: a close image capturing distance interval, a medium image capturing distance interval, and a far image capturing distance interval. In addition, each image capturing distance interval can be corresponding to multiple types of pet features, and different types of pet features corresponding to the same image capturing distance interval have different priorities. References can be made to the following Table 2:

TABLE 2

| Image capturing distance interval | Pet feature type | Priority |
|---|---|---|
| Close | Nose print feature | / |
| Medium | Front face feature, nose print feature | Front face feature > nose print feature |
| Far | Whole-body feature, front face feature, nose print feature | Whole-body feature > front face feature > nose print feature |

Figure 6:
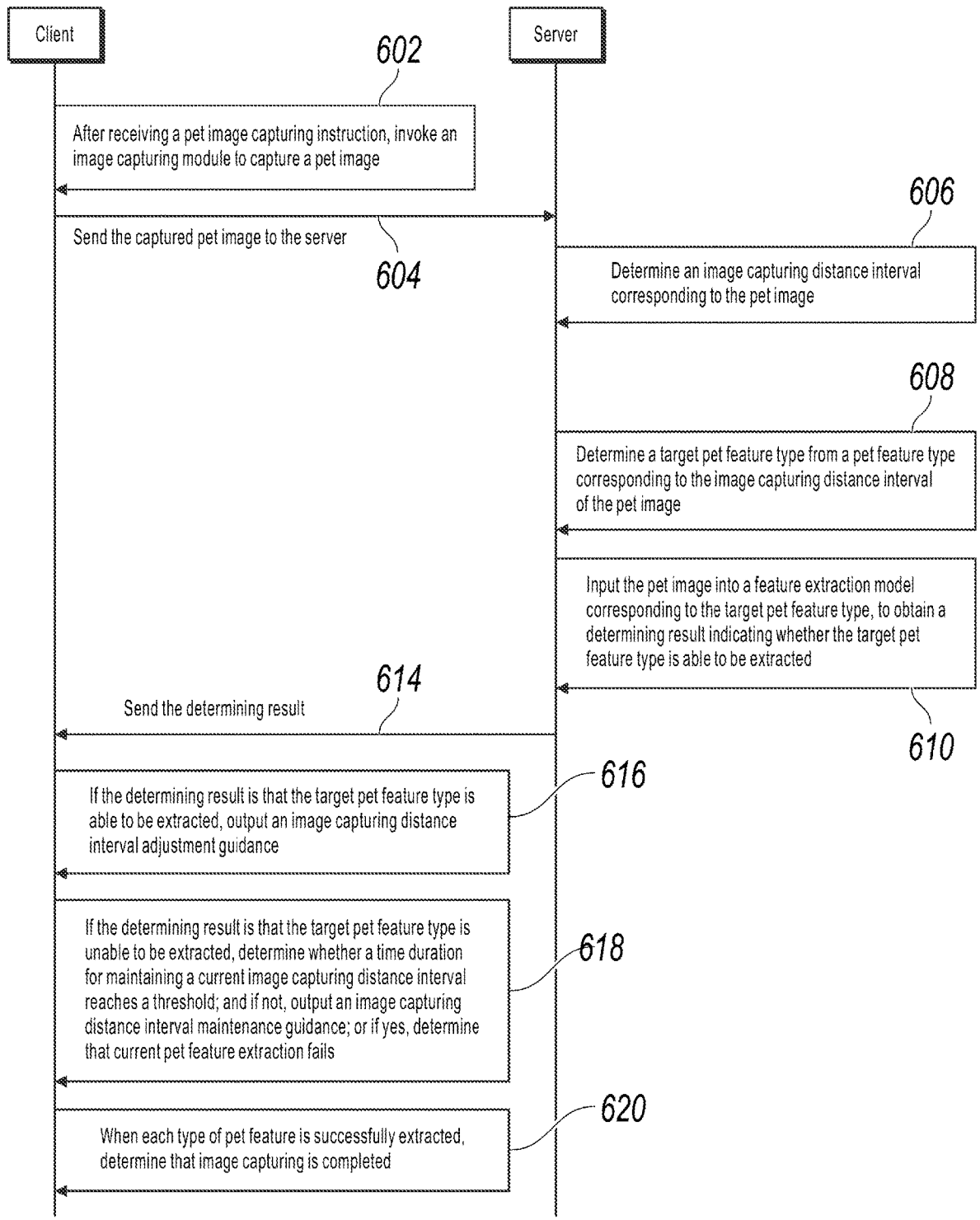
FIG. 6 is a multi-party interaction diagram illustrating assisted image capturing for a pet, according to an example embodiment of this specification.

Referring to FIG. 6, FIG. 6 is a multi-party interaction diagram illustrating assisted image capturing for a pet, according to an example embodiment of this specification. The method includes the following steps: Step 602: After receiving a pet image capturing instruction, a client invokes an image capturing module to capture a pet image.

Step 604: The client sends the captured pet image to a server.

Step 606: The server determines an image capturing distance interval corresponding to the pet image.

For details of steps 602-606, refer to the above-mentioned embodiment. Details are omitted here for simplicity.

Step 608: The server determines a target pet feature type from a pet feature type corresponding to the image capturing distance interval of the pet image.

In this embodiment, the server can use a pet feature type with a highest priority in the pet feature type corresponding to the image capturing distance interval as the target pet feature type.

The above-mentioned Table 2 is still used as an example. Assume that a current image capturing distance interval is the "close image capturing distance interval", and the target pet feature type is the nose print feature. Assume that the current image capturing distance interval is the "medium image capturing distance interval", and the target pet feature type is the front face feature. Assume that the current image capturing distance interval is the "far image capturing distance interval", and the target pet feature type is the whole-body feature.

Step 610: The server inputs the pet image into a feature extraction model corresponding to the target pet feature type, to obtain a determining result indicating whether the target pet feature type is able to be extracted.

In this embodiment, the server pre-trains feature extraction models of different pet feature types, for example, a feature extraction model corresponding to the nose print feature, a feature extraction model corresponding to the front face feature, and a feature extraction model corresponding to the whole-body feature.

The server can input the pet image into the feature extraction model corresponding to the target pet feature type, to obtain a result indicating whether the target pet feature type is able to be extracted.

Step 614: The server sends the determining result to the client.

In this embodiment, the server can send the determining result indicating whether the target pet feature type is able to be extracted to the client.

Step 616: If the determining result is that the target pet feature type is able to be extracted, the client outputs an image capturing distance interval adjustment guidance.

Step 618: If the determining result is that the target pet feature type is unable to be extracted, determine whether a time duration for maintaining a current image capturing distance interval reaches a threshold; and if not, output an image capturing distance interval maintenance guidance; or if yes, determine that current pet feature extraction fails.

For steps 614-618, refer to the above-mentioned embodiment. Details are omitted here for simplicity.

It is worthwhile to note that although not shown in FIG. 6, in the above-mentioned steps 616-618, the client still continuously sends the captured pet images to the server, so the server performs feature extraction.

In this embodiment, after extracting the target pet feature type (with the highest priority) from the pet image in step 610, the server can further extract, from the pet image, a pet feature whose priority is lower than that of the target pet feature type.

For example, assume that a current pet image is a whole-body image of a pet, a corresponding image capturing distance interval is the "far image capturing distance interval", and pet feature types corresponding to the interval are a whole-body feature, a front face feature, and a nose print feature. In steps 608-610, the server uses the whole-body feature (with the highest priority) as the target pet feature type, and extracts the whole-body feature of the pet from the image. The server can further determine whether extraction of the front face feature with a second highest priority fails. If the extraction fails, the server can extract the pet feature with the second highest priority from the pet image. For example, the server inputs the pet image to a feature extraction model corresponding to the front face feature, to extract the front face feature. Similarly, if extraction of the front face feature succeeds, the server can further determine whether a nose print feature whose priority is lower than that of the front face feature fails to be extracted. If the extraction fails, the front face feature is also extracted from the pet image. For example, the pet image can be input into a feature extraction model corresponding to the nose print feature, so as to extract the nose print feature.

By using the above-mentioned method, the pet image captured in the current image capturing distance interval can be used to re-extract a pet feature that previously fails to be extracted, and the non-extracted feature can be compensated for. In addition, the server can further notify the client of a message indicating successful extraction. In this case, the client does not need to guide the user to re-take the picture corresponding to the failure feature, thereby greatly improving user experience.

In this embodiment, the above-mentioned steps 604-618 can be iteratively performed until extraction of each type of pet feature is completed.

Step 620: When each type of pet feature is successfully extracted, the client determines that image capturing is completed.

In this embodiment, when detecting that all types of pet features are successfully extracted, the client can determine that image capturing is completed, and stop invoking the image capturing module to capture an image.

In this embodiment, the server can store extracted various types of pet features, so as to prove the pet identity by using these pet features. If pet insurance needs to be subsequently underwritten, the pet identity can be verified by using the stored features.

In addition, in another embodiment, in addition to determining the pet identity, the server can further determine, based on the obtained pet image, whether the pet is injured and whether there is a defect, and store related image evidence, so as to store evidences for subsequent pet insurance underwriting.

It can be understood from the above-mentioned description that, in an embodiment of this specification, when a pet feature corresponding to a current image capturing distance interval fails to be extracted, a server can further automatically attempt to extract these pet features that were failed to be extracted according to pet images captured in other image capturing distance intervals, so as to finally extract various types of pet features. In addition, a user does not need to adjust the image capturing distance interval for multiple times, thereby improving user experience.

Corresponding to the above-mentioned embodiment of the assisted image capturing method for a pet, this specification further provides an embodiment of an assisted image capturing apparatus for a pet.

Figure 7:
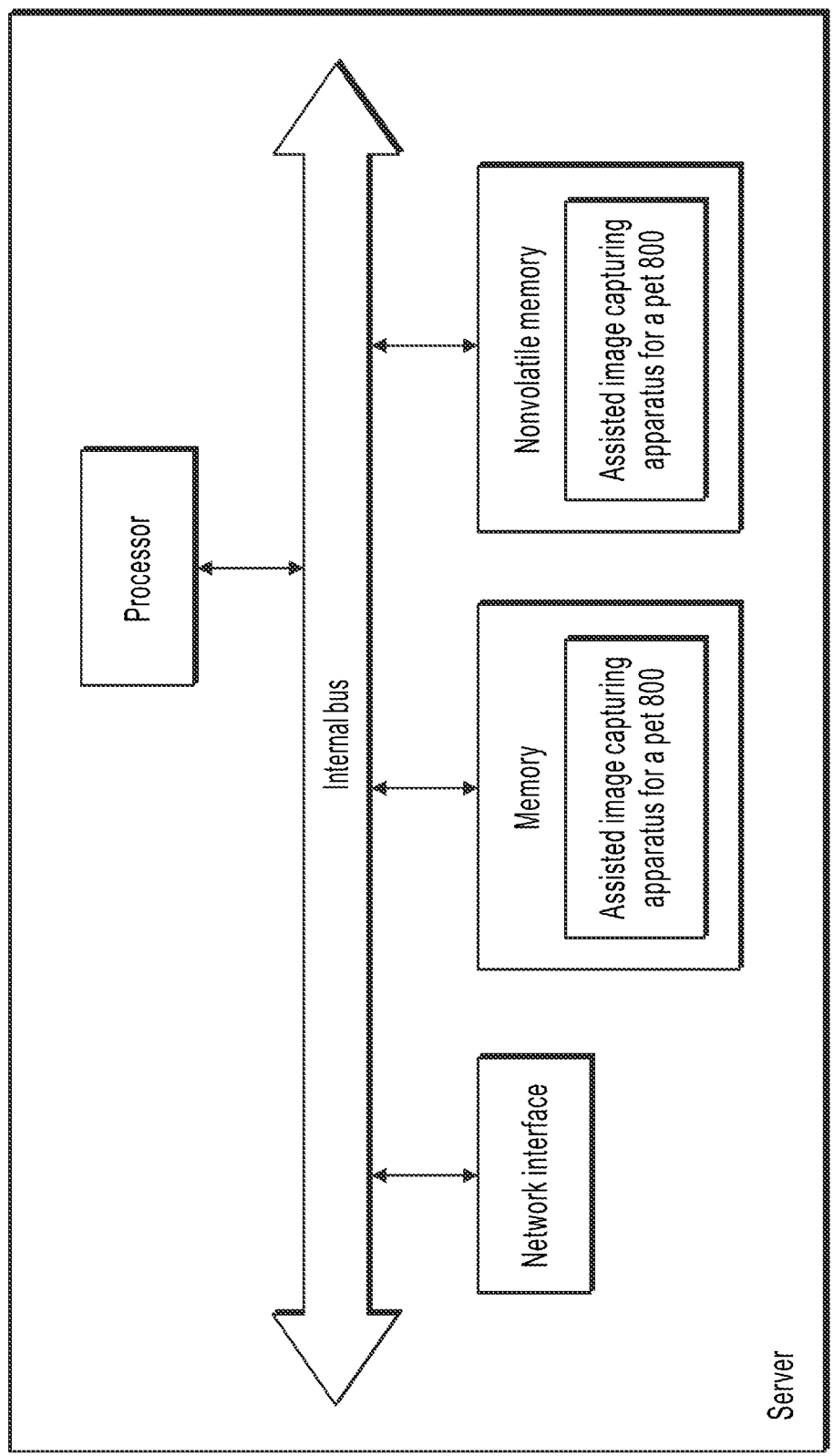
FIG. 7 is a structural diagram illustrating hardware of a terminal device on which an assisted image capturing apparatus for a pet is located, according to an example embodiment of this specification.

An embodiment of an assisted image capturing apparatus for a pet in this specification can be applied to a terminal device. The apparatus embodiment can be implemented by software, hardware, or a combination of hardware and software. Software implementation is used as an example. As a logical apparatus, the apparatus is formed by reading a corresponding computer program instruction in a non-volatile memory to a memory by a processor of a terminal device where the apparatus is located. In terms of hardware, FIG. 7 is a hardware structural diagram illustrating a terminal device on which an assisted image capturing apparatus 800 for a pet is located in this specification. In addition to a processor, a memory, a network interface, and a non-volatile memory shown in FIG. 7, the terminal device where the apparatus is located in the embodiment can usually include other hardware based on an actual function of the device. Details are not described.

Figure 8:
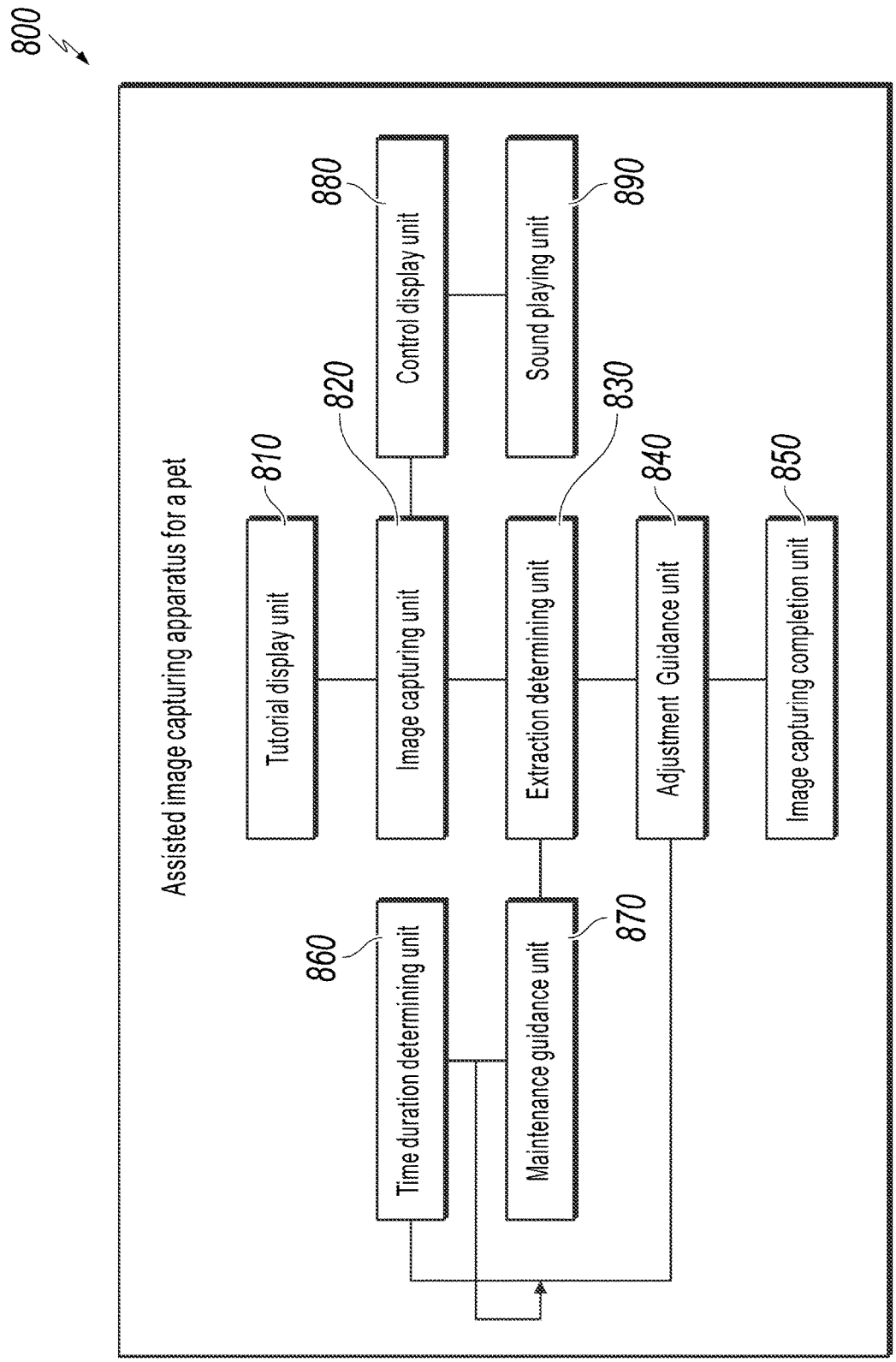
FIG. 8 is a block diagram illustrating an assisted image capturing apparatus for a pet, according to an example embodiment of this specification.

FIG. 8 is a block diagram illustrating an assisted image capturing apparatus for a pet, according to an example embodiment of this specification.

Referring to FIG. 8, the assisted image capturing apparatus 800 for a pet can be applied to the terminal device shown in FIG. 7, and includes: a tutorial display unit 810, an image capturing unit 820, an extraction determining unit 830, an adjustment guidance unit 840, an image capturing completion unit 850, a time duration determining unit 860, a maintenance guidance unit 870, a control display unit 880, and a sound playing unit 890.

The image capturing unit 820 is configured to: after a pet image capturing instruction is received, invoke an image capturing module to capture a pet image;

the extraction determining unit 830 is configured to determine whether a pet feature having a type that corresponds to an image capturing distance interval to which the pet image belongs is able to be extracted from the pet image; and the adjustment guidance unit 840 is configured to: when the pet feature having the type is extracted, output an image capturing distance interval adjustment guidance, so as to guide a user to adjust the image capturing distance interval, and continue to capture another pet image.

Optionally, the apparatus further includes: the maintenance guidance unit 870, configured to: when the pet feature of the type is unable to be extracted, output an image capturing distance interval maintenance guidance, so as to guide the user to maintain a current image capturing distance interval, and continue to capture another pet image.

Optionally, the apparatus further includes: the time duration determining unit 860, configured to: when the pet feature of the type is unable to be extracted, determine whether a time duration for maintaining the current image capturing distance interval reaches a time duration threshold; the adjustment guidance unit 840, further configured to: if yes, output the image capturing distance interval adjustment guidance, and determine that a pet feature of a type corresponding to the current image capturing distance interval fails to be extracted; and the maintenance guidance unit 870, further configured to: if no, output the image capturing distance interval maintenance guidance.

Optionally, the apparatus further includes: the tutorial display unit 810, configured to display an image capturing tutorial, where the image capturing tutorial includes several different image capturing distance intervals and pet feature types corresponding to the different image capturing distance intervals, so as to prompt the user to capture images based on the different image capturing distance intervals.

Optionally, the image capturing tutorial further includes a change sequence prompt of the several image capturing distance intervals.

Optionally, a presentation manner of the image capturing tutorial includes: one or more of a video, an animation, an audio, or a text.

Optionally, the apparatus further includes: the control display unit 880, configured to display several sound playing controls on a screen, where different sound playing controls correspond to different types of sounds; and the sound playing unit 890, configured to: in response to a trigger instruction of the user for a target sound playing control, play a sound corresponding to the target sound playing control, so as to attract attention of a pet.

Optionally, the extraction determining unit 830 is configured to: send the captured pet image to a server, so the server determines the image capturing distance interval to which the pet image belongs, and determines whether the pet feature of the type corresponding to the image capturing distance interval is able to be extracted from the pet image; and receive a determining result sent by the server.

Optionally, there are three image capturing distance intervals, which are respectively corresponding to a nose print feature, a face feature, and a whole-body feature of a pet.

Optionally, each image capturing distance interval corresponds to several pet feature types, and different pet feature types corresponding to a same image capturing distance interval have different priorities; and the extraction determining unit 830 is configured to: determine whether a pet feature with a highest priority corresponding to the image capturing distance interval to which the pet image belongs is able to be extracted from the pet image; if yes, determine whether a pet feature with a second highest priority corresponding to the image capturing distance interval to which the pet image belongs fails to be extracted; and if failed, extract the pet feature with the second highest priority from the pet image.

Optionally, the apparatus further includes: the image capturing completion unit 850, configured to: when extraction of different types of pet features is completed, determine that image capturing is completed.

For an implementation process of functions and roles of each unit in the apparatus, references can be made to an implementation process of corresponding steps in the above-mentioned method. Details are omitted here.

Because an apparatus embodiment corresponds to a method embodiment, for related parts, references can be made to related descriptions in the method embodiments. The apparatus embodiment described above is merely an example. The units described as separate parts can or do not have to be physically separate, and parts displayed as units can or do not have to be physical units, can be located in one position, or can be distributed on multiple network units. Some or all of the modules can be selected based on actual needs to achieve the objectives of the solutions of this specification. A person of ordinary skill in the art can understand and implement the embodiments of this application without creative efforts.

The system, apparatus, module, or unit illustrated in the above-mentioned embodiments can be implemented by using a computer chip or an entity, or can be implemented by using a product having a certain function. A typical implementation device is a computer, and a specific form of the computer can be a personal computer, a laptop computer, a cellular phone, a camera phone, a smartphone, a personal digital assistant, a media player, a navigation device, an email receiving/sending device, a game console, a tablet computer, a wearable device, or a combination of any several of these devices.

Corresponding to the above-mentioned embodiment of the assisted image capturing method for a pet, this specification further provides an assisted image capturing apparatus for a pet. The apparatus includes a processor and a memory that is configured to store machine-executable instructions. The processor and the memory are generally connected to each other by using an internal bus. In another possible implementation, the device can further include an external interface capable of communicating with another device or component.

In this embodiment, by reading and executing the machine executable instructions that are stored in the memory and that correspond to an assisted image capturing logic for a pet, the processor is enabled to: after a pet image capturing instruction is received, invoke an image capturing module to capture a pet image; determine whether a pet feature having a type that corresponds to an image capturing distance interval to which the pet image belongs is able to be extracted from the pet image; and when the pet feature having the type is extracted, output an image capturing distance interval adjustment guidance, so as to guide a user to adjust the image capturing distance interval, and continue to capture another pet image.

Optionally, the processor is further enabled to: when the pet feature of the type is unable to be extracted, output an image capturing distance interval maintenance guidance, so as to guide the user to maintain a current image capturing distance interval, and continue to capture another pet image.

Optionally, the processor is further enabled to: when the pet feature of the type is unable to be extracted, determine whether a time duration for maintaining the current image capturing distance interval reaches a time duration threshold; and if yes, output the image capturing distance interval adjustment guidance, and determine that a pet feature of a type corresponding to the current image capturing distance interval fails to be extracted; or if no, output the image capturing distance interval maintenance guidance.

Optionally, after the image capturing instruction is received, the processor is further enabled to: display an image capturing tutorial, where the image capturing tutorial includes several different image capturing distance intervals and pet feature types corresponding to the different image capturing distance intervals, so as to prompt the user to capture images based on the different image capturing distance intervals.

Optionally, the image capturing tutorial further includes a change sequence prompt of the several image capturing distance intervals.

Optionally, a presentation manner of the image capturing tutorial includes: one or more of a video, an animation, an audio, or a text.

Optionally, after the pet image capturing instruction is received, the processor is further enabled to: display several sound playing controls on a screen, where different sound playing controls correspond to different types of sounds; and in response to a trigger instruction of the user for a target sound playing control, play a sound corresponding to the target sound playing control, so as to attract attention of a pet.

Optionally, when determining whether the pet feature of the type corresponding to the image capturing distance interval of the pet image is able to be extracted from the pet image, the processor is enabled to: send the captured pet image to a server, so the server determines the image capturing distance interval to which the pet image belongs, and determines whether the pet feature of the type corresponding to the image capturing distance interval is able to be extracted from the pet image; and receive a determining result sent by the server.

Optionally, there are three image capturing distance intervals, which are respectively corresponding to a nose print feature, a face feature, and a whole-body feature of a pet.

Optionally, each image capturing distance interval corresponds to several pet feature types, and different pet feature types corresponding to a same image capturing distance interval have different priorities; and the determining whether a pet feature having a type that corresponds to an image capturing distance interval to which the pet image belongs is able to be extracted from the pet image includes: determining whether a pet feature with a highest priority corresponding to the image capturing distance interval to which the pet image belongs is able to be extracted from the pet image; if yes, determining whether a pet feature with a second highest priority corresponding to the image capturing distance interval to which the pet image belongs fails to be extracted; and if failed, extracting the pet feature with the second highest priority from the pet image.

Optionally, the processor is further enabled to: when extraction of different types of pet features is completed, determine that image capturing is completed.

Corresponding to the above-mentioned embodiment of the assisted image capturing method for a pet, this specification further provides a computer readable storage medium. The computer readable storage medium stores a computer program, and when the program is executed by a processor, the following steps are implemented: after a pet image capturing instruction is received, invoking an image capturing module to capture a pet image; determining whether a pet feature having a type that corresponds to an image capturing distance interval to which the pet image belongs is able to be extracted from the pet image; and when the pet feature having the type is extracted, outputting an image capturing distance interval adjustment guidance, so as to guide a user to adjust the image capturing distance interval, and continuing to capture another pet image.

Optionally, the method further includes: when the pet feature of the type is unable to be extracted, outputting an image capturing distance interval maintenance guidance, so as to guide the user to maintain a current image capturing distance interval, and continuing to capture another pet image.

Optionally, the method further includes: when the pet feature of the type is unable to be extracted, determining whether a time duration for maintaining the current image capturing distance interval reaches a time duration threshold; and if yes, outputting the image capturing distance interval adjustment guidance, and determining that a pet feature of a type corresponding to the current image capturing distance interval fails to be extracted; or if no, outputting the image capturing distance interval maintenance guidance.

Optionally, after the image capturing instruction is received, the method further includes: displaying an image capturing tutorial, where the image capturing tutorial includes several different image capturing distance intervals and pet feature types corresponding to the different image capturing distance intervals, so as to prompt the user to capture images based on the different image capturing distance intervals.

Optionally, the image capturing tutorial further includes a change sequence prompt of the several image capturing distance intervals.

Optionally, a presentation manner of the image capturing tutorial includes: one or more of a video, an animation, an audio, or a text.

Optionally, after the pet image capturing instruction is received, the method further includes: displaying several sound playing controls on a screen, where different sound playing controls correspond to different types of sounds; and in response to a trigger instruction of the user for a target sound playing control, playing a sound corresponding to the target sound playing control, so as to attract attention of a pet.

Optionally, the determining whether a pet feature having a type that corresponds to an image capturing distance interval to which the pet image belongs is able to be extracted from the pet image includes: sending the captured pet image to a server, so the server determines the image capturing distance interval to which the pet image belongs, and determines whether the pet feature of the type corresponding to the image capturing distance interval is able to be extracted from the pet image; and receiving a determining result sent by the server.

Optionally, there are three image capturing distance intervals, which are respectively corresponding to a nose print feature, a face feature, and a whole-body feature of a pet.

Optionally, each image capturing distance interval corresponds to several pet feature types, and different pet feature types corresponding to a same image capturing distance interval have different priorities; and the determining whether a pet feature having a type that corresponds to an image capturing distance interval to which the pet image belongs is able to be extracted from the pet image includes: determining whether a pet feature with a highest priority corresponding to the image capturing distance interval to which the pet image belongs is able to be extracted from the pet image; if yes, determining whether a pet feature with a second highest priority corresponding to the image capturing distance interval to which the pet image belongs fails to be extracted; and if failed, extracting the pet feature with the second highest priority from the pet image.

Optionally, the method further includes: when extraction of different types of pet features is completed, determining that image capturing is completed.

Corresponding to the above-mentioned embodiments of the assisted image capturing methods for pets, this specification further provides an embodiment of assisted image capturing apparatuses for pets.

Figure 9:
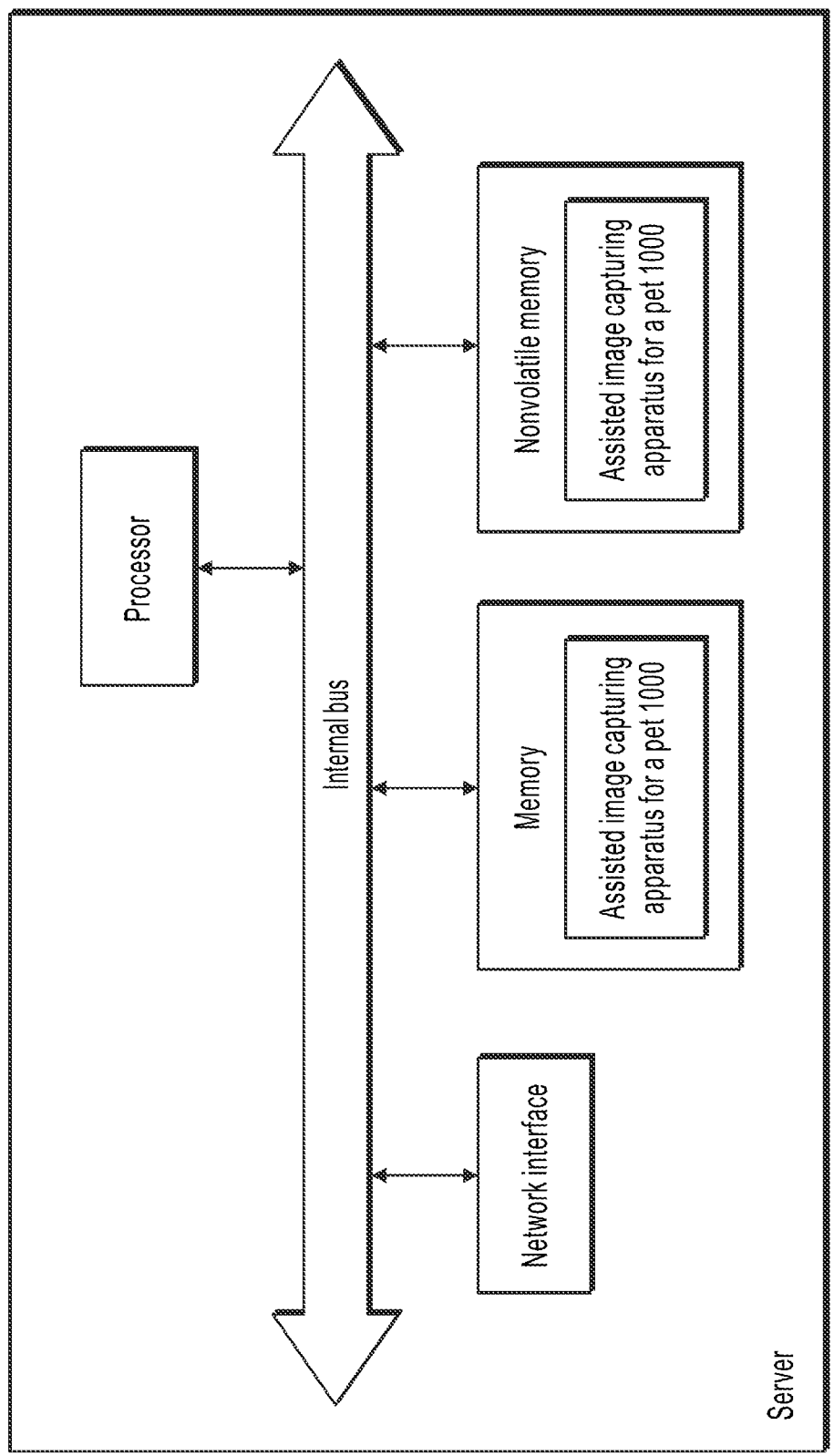
FIG. 9 is a structural diagram illustrating hardware of a server on which an assisted image capturing apparatus for a pet is located, according to an example embodiment of this specification.

An embodiment of an assisted image capturing apparatus for a pet in this specification can be applied to a server. The apparatus embodiment can be implemented by software, hardware, or a combination of hardware and software. Software implementation is used as an example. As a logical apparatus, the software is formed by reading a corresponding computer program instruction in a non-volatile memory and running the instruction in a memory by a processor in a server of the apparatus. In terms of hardware, FIG. 9 is a hardware structural diagram illustrating a server on which an assisted image capturing apparatus 1000 for a pet is located in this specification. In addition to a processor, a memory, a network interface, and a non-volatile memory shown in FIG. 9, the server where the apparatus is located in the embodiment can usually include other hardware based on an actual function of the server. Details are not described.

Figure 10:
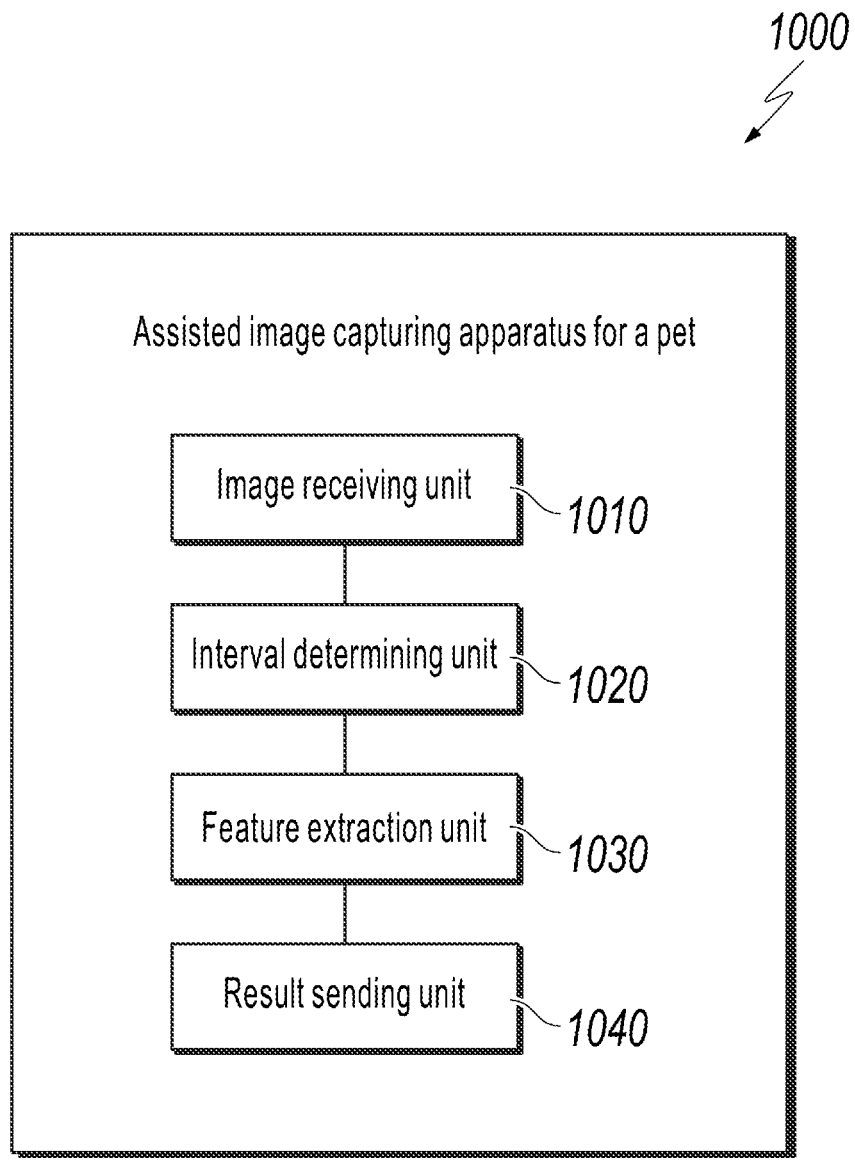
FIG. 10 is a block diagram illustrating an assisted image capturing apparatus for a pet, according to an example embodiment of this specification.

FIG. 10 is a block diagram illustrating an assisted image capturing apparatus for a pet, according to an example embodiment of this specification.

Referring to FIG. 10, the assisted image capturing apparatus 1000 for a pet can be applied to the server shown in FIG. 9, and includes: an image receiving unit 1010, an interval determining unit 1020, a feature extraction unit 1030, and a result sending unit 1040.

The image receiving unit 1010 is configured to receive a pet image sent by a client, where the pet image is captured by the client by invoking an image capturing module after receiving a pet image capturing instruction; the interval determining unit 1020 is configured to determine an image capturing distance interval corresponding to the pet image; the feature extraction unit 1030 is configured to determine whether a pet feature of a type corresponding to the image capturing distance interval is able to be extracted from the pet image; and the result sending unit 1040 is configured to send a determining result to the client, so when the determining result is that the pet feature of the type is able to be extracted, the client outputs an image capturing distance interval adjustment guidance, so as to guide a user to adjust the image capturing distance interval, and continue to capture another pet image.

Optionally, the interval determining unit 1020 is configured to: input the pet image into a distance recognition model to obtain the image capturing distance interval corresponding to the pet image.

Optionally, feature extraction models corresponding to different pet feature types are predetermined, and the feature extraction unit is configured to: determine a corresponding pet feature type according to the image capturing distance interval of the pet image; and input the pet image into a feature extraction model corresponding to the pet feature type, to obtain a determining result indicating whether the pet feature of the type corresponding to the image capturing distance interval is able to be extracted from the pet image.

Optionally, there are three image capturing distance intervals, which are respectively corresponding to a nose print feature, a face feature, and a whole-body feature of a pet.

Optionally, each image capturing distance interval corresponds to several pet feature types, and different pet feature types corresponding to a same image capturing distance interval have different priorities; and the feature extraction unit 1030 is configured to: determine whether a pet feature with a highest priority corresponding to the image capturing distance interval to which the pet image belongs is able to be extracted from the pet image; if yes, determine whether a pet feature with a second highest priority corresponding to the image capturing distance interval to which the pet image belongs fails to be extracted; and if failed, extract the pet feature with the second highest priority from the pet image.

For an implementation process of functions and roles of each unit in the apparatus, references can be made to an implementation process of corresponding steps in the above-mentioned method. Details are omitted here.

Because an apparatus embodiment corresponds to a method embodiment, for related parts, references can be made to related descriptions in the method embodiments. The apparatus embodiment described above is merely an example. The units described as separate parts can or do not have to be physically separate, and parts displayed as units can or do not have to be physical units, can be located in one position, or can be distributed on multiple network units. Some or all of the modules can be selected based on actual needs to achieve the objectives of the solutions of this specification. A person of ordinary skill in the art can understand and implement the embodiments of this application without creative efforts.

The system, apparatus, module, or unit illustrated in the above-mentioned embodiments can be implemented by using a computer chip or an entity, or can be implemented by using a product having a certain function. A typical implementation device is a computer, and a specific form of the computer can be a personal computer, a laptop computer, a cellular phone, a camera phone, a smartphone, a personal digital assistant, a media player, a navigation device, an email receiving/sending device, a game console, a tablet computer, a wearable device, or a combination of any several of these devices.

Corresponding to the above-mentioned embodiment of the assisted image capturing methods for pets, this specification further provides assisted image capturing apparatuses for pets. The apparatus includes a processor and a memory that is configured to store machine-executable instructions. The processor and the memory are generally connected to each other by using an internal bus. In another possible implementation, the device can further include an external interface capable of communicating with another device or component.

In this embodiment, by reading and executing the machine executable instructions that are stored in the memory and that correspond to an assisted image capturing logic for a pet, the processor is enabled to: receive a pet image sent by a client, where the pet image is captured by the client by invoking an image capturing module after receiving a pet image capturing instruction; determine an image capturing distance interval corresponding to the pet image; determine whether a pet feature of a type corresponding to the image capturing distance interval is able to be extracted from the pet image; and send a determining result to the client, so when the determining result is that the pet feature of the type is able to be extracted, the client outputs an image capturing distance interval adjustment guidance, so as to guide a user to adjust the image capturing distance interval, and continue to capture another pet image.

Optionally, when determining the image capturing distance interval corresponding to the pet image, the processor is enabled to: input the pet image into a distance recognition model to obtain the image capturing distance interval corresponding to the pet image.

Optionally, feature extraction models corresponding to different pet feature types are predetermined, and when determining whether the pet feature of the type corresponding to the image capturing distance interval is able to be extracted from the pet image, the processor is enabled to: determine a corresponding pet feature type according to the image capturing distance interval of the pet image; and input the pet image into a feature extraction model corresponding to the pet feature type, to obtain a determining result indicating whether the pet feature of the type corresponding to the image capturing distance interval is able to be extracted from the pet image.

Optionally, there are three image capturing distance intervals, which are respectively corresponding to a nose print feature, a face feature, and a whole-body feature of a pet.

Optionally, each image capturing distance interval corresponds to several pet feature types, and different pet feature types corresponding to a same image capturing distance interval have different priorities; and when determining whether the pet feature of the type corresponding to the image capturing distance interval to which the pet image belongs is able to be extracted from the pet image, the processor is enabled to: determine whether a pet feature with a highest priority corresponding to the image capturing distance interval to which the pet image belongs is able to be extracted from the pet image; if yes, determine whether a pet feature with a second highest priority corresponding to the image capturing distance interval to which the pet image belongs fails to be extracted; and if failed, extract the pet feature with the second highest priority from the pet image.

Corresponding to the above-mentioned embodiment of the assisted image capturing method for a pet, this specification further provides a computer readable storage medium, where the computer readable storage medium stores a computer program, and when the program is executed by a processor, the following steps are implemented: receiving a pet image sent by a client, where the pet image is captured by the client by invoking an image capturing module after receiving a pet image capturing instruction; determining an image capturing distance interval corresponding to the pet image; determining whether a pet feature of a type corresponding to the image capturing distance interval is able to be extracted from the pet image; and sending a determining result to the client, so when the determining result is that the pet feature of the type is able to be extracted, the client outputs an image capturing distance interval adjustment guidance, so as to guide a user to adjust the image capturing distance interval, and continue to capture another pet image.

Optionally, the determining an image capturing distance interval corresponding to the pet image includes: inputting the pet image into a distance recognition model to obtain the image capturing distance interval corresponding to the pet image.

Optionally, feature extraction models corresponding to different pet feature types are predetermined, and the determining whether a pet feature of a type corresponding to the image capturing distance interval is able to be extracted from the pet image includes: determining a corresponding pet feature type according to the image capturing distance interval of the pet image; and inputting the pet image into a feature extraction model corresponding to the pet feature type, to obtain a determining result indicating whether the pet feature of the type corresponding to the image capturing distance interval is able to be extracted from the pet image.

Optionally, there are three image capturing distance intervals, which are respectively corresponding to a nose print feature, a face feature, and a whole-body feature of a pet.

Optionally, each image capturing distance interval corresponds to several pet feature types, and different pet feature types corresponding to a same image capturing distance interval have different priorities; and the determining whether a pet feature having a type that corresponds to an image capturing distance interval to which the pet image belongs is able to be extracted from the pet image includes: determining whether a pet feature with a highest priority corresponding to the image capturing distance interval to which the pet image belongs is able to be extracted from the pet image; if yes, determining whether a pet feature with a second highest priority corresponding to the image capturing distance interval to which the pet image belongs fails to be extracted; and if failed, extracting the pet feature with the second highest priority from the pet image.

Specific embodiments of this specification are described above. Other embodiments fall within the scope of the appended claims. In some situations, the actions or steps described in the claims can be performed in an order different from the order in the embodiments and the desired results can still be achieved. In addition, the process depicted in the accompanying drawings does not necessarily need a particular execution order to achieve the desired results. In some implementations, multi-tasking and concurrent processing is feasible or can be advantageous.

The above-mentioned descriptions are merely preferred embodiments of this specification, but are not intended to limit this specification. Any modification, equivalent replacement, or improvement made without departing from the spirit and principle of this specification shall fall within the protection scope of this specification.

What is claimed is:

1. A computer-implemented method for image capturing of a pet, wherein the computer-implemented method comprises:
    maintaining a predetermined mapping relationship between different distance intervals and different pet feature types, wherein a distance interval is measured between an image capturing device and the pet, and wherein the different distance intervals comprise a first distance interval that corresponds to a pet feature having a first type and a second distance interval that corresponds to a pet feature having a second type;
    after receiving a pet image capturing instruction, invoking the image capturing device to capture a pet image when the image capturing device is positioned within the first distance interval from the pet;
    determining whether the pet feature having the first type that corresponds to the first distance interval is extracted from the pet image; and
    in response to determining that the pet feature having the first type is extracted, outputting an image capturing distance interval adjustment guidance that guides a user to adjust a position of the image capturing device to move the image capturing device to being positioned within the second distance interval from the pet.

2. The computer-implemented method according to claim 1, further comprising:
    determining whether a second pet feature of the second type that corresponds to the second distance interval is extracted from another pet image captured when the image capturing device is positioned within the second distance interval from the pet; and in response to determining that the second pet feature of the second type is extracted, outputting an image capturing distance interval maintenance guidance that guides the user to maintain the image capturing device within the second distance interval; and continuing to capture a further pet image when the image capturing device is positioned within the second distance interval from the pet.

3. The computer-implemented method according to claim 2, further comprising:

in response to determining that the second pet feature of the second type is not extracted, determining whether a time duration for maintaining the image capturing device within the second distance interval reaches a time duration threshold; and if yes, outputting the image capturing distance interval adjustment guidance, and determining that the second pet feature of the second type corresponding to the second distance interval fails to be extracted; or if no, outputting the image capturing distance interval maintenance guidance.

4. The computer-implemented method according to claim 1, after the receiving the pet image capturing instruction, further comprising:

displaying an image capturing tutorial, wherein the image capturing tutorial comprises the different distance intervals and the different pet feature types.

5. The computer-implemented method according to claim 4, wherein the image capturing tutorial further comprises a change sequence prompt guiding the user to move the image capturing device according to a sequence of the different distance intervals.

6. The computer-implemented method according to claim 4, wherein a presentation manner of the image capturing tutorial comprises:

one or more of a video, an animation, an audio, or a text.

7. The computer-implemented method according to claim 1, after the receiving the pet image capturing instruction, further comprising:

displaying different sound playing controls on a screen, wherein different sound playing controls correspond to different types of sounds; and in response to a trigger instruction of the user for a target sound playing control, playing a sound corresponding to the target sound playing control, so as to attract attention of the pet.

8. The computer-implemented method according to claim 1, wherein the determining whether the pet feature having the first type that corresponds to the first distance interval is extracted from the pet image comprises:

sending the pet image to a server, wherein the server determines whether the pet feature of the first type corresponding to the first distance interval is extracted from the pet image; and receiving a determining result sent by the server.

9. The computer-implemented method according to claim 1, wherein the pet feature having the first type comprises a nose print feature of the pet, and the pet feature having the second type comprises a face feature of the pet.

10. The computer-implemented method according to claim 1, wherein each distance interval corresponds to one or more pet feature types, and different pet feature types corresponding to a same distance interval have different priorities; and wherein the determining whether the pet feature having the first type that corresponds to the first distance interval is extracted from the pet image comprises:

determining whether a first pet feature with a highest priority corresponding to the first distance interval is extracted from the pet image;

in response to determining that the first pet feature with the highest priority is extracted, determining whether a second pet feature with a second highest priority corresponding to the first distance interval fails to be extracted; and in response to determining that the second pet feature with the second highest priority fails to be extracted, extracting the second pet feature with the second highest priority from the pet image.

11. The computer-implemented method according to claim 1, further comprising:

in response to extraction of pet features having the different pet feature types is completed, determining that image capturing is completed.

12. A computer-implemented method for capture an image of a pet, wherein the computer-implemented method comprises:

maintaining a predetermined mapping relationship between different distance intervals and different pet feature types, wherein a distance interval is measured between an image capturing device and the pet, and wherein the different distance intervals comprise a first distance interval that corresponds to a pet feature having a first type and a second distance interval that corresponds to a pet feature having a second type;

receiving a pet image sent by a client device when the image capturing device is positioned within the first distance interval from the pet, wherein the pet image is captured by the client device after receiving a pet image capturing instruction;

determining that a position of the image capturing device is being positioned within the first distance interval from the pet;

determining whether the pet feature of the first type corresponding to the first distance interval is extracted from the pet image; and sending a determining result to the client device, wherein the determining result comprises that the pet feature of the first type is extracted, the determining result prompting the client device to output an image capturing distance interval adjustment guidance that guides a user to adjust the position of the image capturing device to move the image capturing device to being positioned within the second distance interval from the pet.

13. The computer-implemented method according to claim 12, wherein the determining that the position of the image capturing device is being positioned within the first distance interval from the pet comprises:

inputting the pet image into a distance recognition model.

14. The computer-implemented method according to claim 12, wherein feature extraction models corresponding to different pet feature types are predetermined, and the determining whether the pet feature of the first type corresponding to the first distance interval is extracted from the pet image comprises:

inputting the pet image into a feature extraction model corresponding to the first type, to obtain the determining result indicating whether the pet feature of the first type corresponding to the first distance interval is extracted from the pet image.

15. The computer-implemented method according to claim 12, wherein the pet feature having the first type comprises a nose print feature, and the pet feature having the second type comprises a face feature of the pet.

16. The computer-implemented method according to claim 12, wherein each distance interval corresponds to one or more pet feature types, and different pet feature types corresponding to a same distance interval have different priorities; and the determining whether the pet feature having the first type that corresponds to the first distance interval is extracted from the pet image comprises:

determining whether a first pet feature with a highest priority corresponding to the first distance interval is extracted from the pet image;

in response to determining that the first pet feature with the highest priority is extracted from the pet image, determining whether a second pet feature with a second highest priority corresponding to the first distance interval belongs fails to be extracted; and in response to determining that the second pet feature fails to be extracted, extracting the second pet feature with the second highest priority from the pet image.

17. A computer-implemented system, comprising:

one or more computers; and one or more computer memory devices interoperably coupled with the one or more computers and having tangible, non-transitory, machine-readable media storing one or more instructions that, when executed by the one or more computers, perform one or more operations comprising:

maintaining a predetermined mapping relationship between different distance intervals and different pet feature types, wherein a distance interval is measured between an image capturing device and a pet, and wherein the different distance intervals comprise a first distance interval that corresponds to a pet feature having a first type and a second distance interval that corresponds to a pet feature having a second type;

after receiving a pet image capturing instruction, invoking the image capturing device to capture a pet image when the image capturing device is positioned within the first distance interval from the pet;

determining whether the pet feature having the first type that corresponds to the first distance interval is extracted from the pet image; and in response to determining that the pet feature having the first type is extracted, outputting an image capturing distance interval adjustment guidance that guides a user to adjust a position of the image capturing device to move the image capturing device to being positioned within the second distance interval from the pet.

18. The computer-implemented system according to claim 17, wherein the one or more operations further comprise:

determining whether a second pet feature of the second type that corresponds to the second distance interval is extracted from another pet image captured when the image capturing device is positioned within the second distance interval from the pet; and in response to determining that the second pet feature of the second type is not extracted, outputting an image capturing distance interval maintenance guidance that guides the user to maintain the image capturing device within the second distance interval; and continuing to capture a further pet image when the image capturing device is positioned within the second distance interval from the pet.

19. The computer-implemented system according to claim 18, wherein the one or more operations further comprise:

in response to determining that the second pet feature of the second type is not extracted, determining whether a time duration for maintaining the image capturing device within the second distance interval reaches a time duration threshold; and if yes, outputting the image capturing distance interval adjustment guidance, and determining that the second pet feature of the second type corresponding to the second distance interval fails to be extracted; or if no, outputting the image capturing distance interval maintenance guidance.

20. The computer-implemented system according to claim 17, wherein the one or more operations further comprise:

after the receiving the pet image capturing instruction, displaying an image capturing tutorial, wherein the image capturing tutorial comprises the different distance intervals and the different pet feature types.

* * * * *